(12) United States Patent
Fuller

(10) Patent No.: US 10,697,526 B2
(45) Date of Patent: Jun. 30, 2020

(54) VARIATOR

(71) Applicant: ALLISON TRANSMISSION, INC., Indianapolis, IN (US)

(72) Inventor: John Fuller, Lancashire (GB)

(73) Assignee: ALLISON TRANSMISSION, INC., Indianapolis, IN (US)

( * ) Notice: Subject to any disclaimer, the term of this patent is extended or adjusted under 35 U.S.C. 154(b) by 951 days.

(21) Appl. No.: 15/100,154

(22) PCT Filed: Dec. 1, 2014

(86) PCT No.: PCT/EP2014/076142
§ 371 (c)(1),
(2) Date: May 27, 2016

(87) PCT Pub. No.: WO2015/079069
PCT Pub. Date: Jun. 4, 2015

(65) Prior Publication Data
US 2017/0009853 A1    Jan. 12, 2017

(30) Foreign Application Priority Data

Nov. 29, 2013 (GB) .................................. 1321150.3
May 16, 2014 (GB) .................................. 1408772.0

(51) Int. Cl.
*F16H 15/38* (2006.01)
*F16H 13/14* (2006.01)
*F02M 35/10* (2006.01)

(52) U.S. Cl.
CPC ....... *F16H 15/38* (2013.01); *F02M 35/10157* (2013.01); *F16H 13/14* (2013.01); *F16H 2015/383* (2013.01)

(58) Field of Classification Search
CPC .... F16H 15/38; F16H 13/14; F16H 2015/383; F02M 35/10157

(Continued)

(56) References Cited

U.S. PATENT DOCUMENTS 1,002,477 A * 9/1911 Weerts .................... F16H 15/12
476/54
1,045,752 A * 11/1912 Scharf .................. B62D 11/183
180/6.32

(Continued)

FOREIGN PATENT DOCUMENTS

DE          3138331 A1    4/1983
DE     102006039319 A1    2/2008

(Continued)

OTHER PUBLICATIONS

International Bureau, "International Preliminary Report on Patentability", PCT/EP2014/076152, dated May 31, 2016, 12 Pages.

(Continued)

*Primary Examiner* — William C Joyce
(74) *Attorney, Agent, or Firm* — Taft Stettinius & Hollister LLP; Stephen F. Rost

(57) ABSTRACT

A variator comprises first and second races disposed for rotation about a variator axis and at least one rolling element disposed in a cavity between the races. In a drive configuration, drive is transmitted between the races and the at least one rolling element; and in a neutral configuration, the at least one rolling element and races are configured whereby the races can move independently of one another. In a method of operating the variator, the neutral configuration is obtained by moving the at least one rolling element to a position in which it ceases to make contact with at least one of the races. The drive configuration is obtained by moving the at least one rolling element to a position in which it makes contact with both of the races.

26 Claims, 10 Drawing Sheets

(58) Field of Classification Search
USPC .............................................. 476/40, 42, 46
See application file for complete search history.

(56) References Cited

U.S. PATENT DOCUMENTS

| | | | | |
|---|---|---|---|---|
| 1,492,863 A * | 5/1924 | Spencer | ................... | F16H 15/12 476/21 |
| 1,715,045 A * | 5/1929 | Richer | ...................... | F16H 3/44 475/216 |
| 1,825,852 A * | 10/1931 | Casselman | ............ | F16H 61/664 476/50 |
| 2,125,999 A * | 8/1938 | Erban | ..................... | F16H 15/38 476/40 |
| 5,007,298 A | 4/1991 | MacHida | | |
| 5,334,097 A * | 8/1994 | Tatara | ..................... | F02B 39/04 418/206.7 |
| 6,030,310 A * | 2/2000 | Greenwood | .............. | F15C 3/06 476/10 |
| 6,666,789 B2 * | 12/2003 | Lee | ......................... | F16H 15/40 476/23 |
| 2008/0274855 A1 | 11/2008 | Pawloski | | |

FOREIGN PATENT DOCUMENTS

| | | |
|---|---|---|
| GB | 2438412 A | 11/2007 |
| GB | 2499704 A | 8/2013 |
| JP | 2006132661 A | 5/2006 |
| WO | 2008038043 A2 | 4/2008 |
| WO | 2011051702 A1 | 5/2011 |
| WO | 2013029147 A1 | 3/2013 |
| WO | 2013104727 A1 | 7/2013 |
| WO | 2013174825 A1 | 11/2013 |

OTHER PUBLICATIONS

International Bureau, "International Preliminary Report on Patentability", PCT/EP2014/076142, dated Jun. 9, 2016, 12 Pages.

International Bureau, "International Search Report", PCT/EP2014/076142, dated Jun. 4, 2015, 4 Pages.

International Bureau, "International Search Report", PCT/EP2014/076152, dated Mar. 30, 2015, 5 Pages.

Chinese Office Action; China National Intellectual Property Administration; Chinese Patent Application No. 201480065434.8; dated Oct. 17, 2018; 14 pages.

United Kingdom Intellectual Property Office, "Search Report under Section 17(5)", UK Patent Application No. GB1321150.3, dated Jun. 20, 2014, 2 Pages.

Indian First Examination Report; Intellectual Property India; Indian Patent Application No. 201617020639; dated Nov. 29, 2019; 8 pages.

Japanese Office Action; Japanese Patent Office; Japanese Patent Application No. 2016-535128; dated Sep. 10, 2019; 2 pages.

* cited by examiner

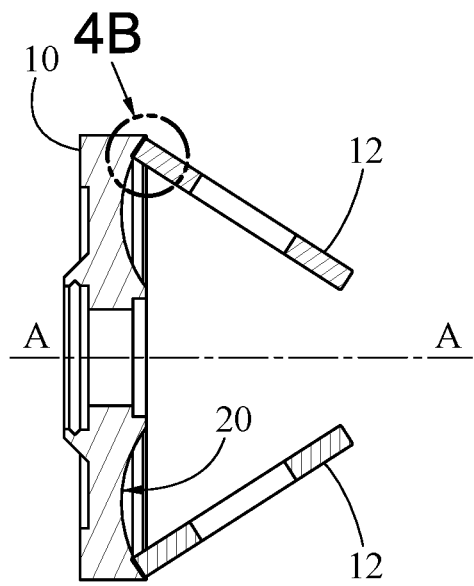
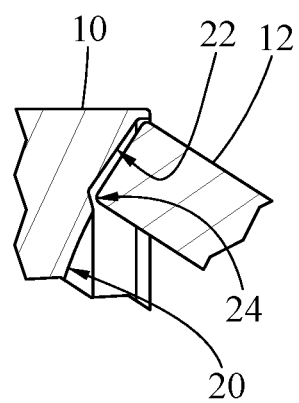
FIG. 4A  FIG. 4B
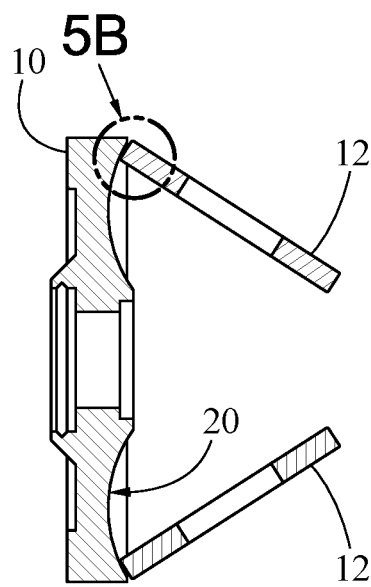
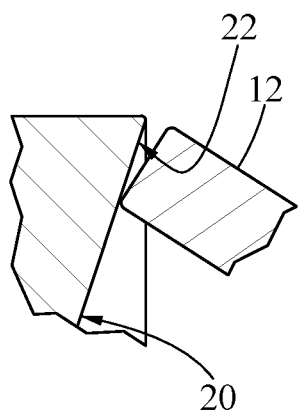
FIG. 5A  FIG. 5B

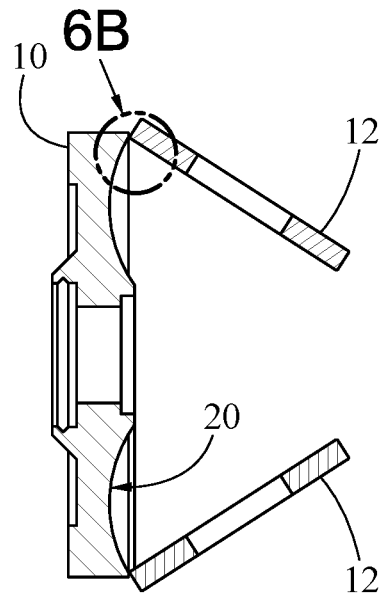
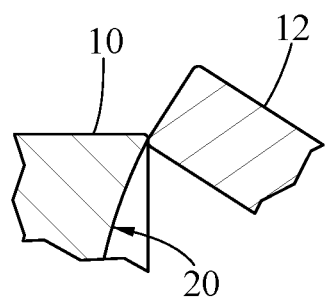
FIG. 6A   FIG. 6B
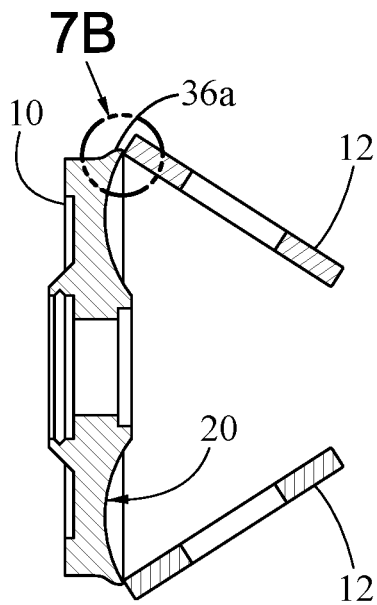
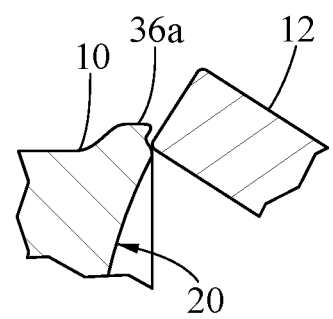
FIG. 7A   FIG. 7B

VARIATOR

CROSS-REFERENCE TO RELATED APPLICATIONS

This application is a national stage application under 35 U.S.C. § 371 of International Application No. PCT/EP2014/076142, filed on Dec. 1, 2014, which claims priority to GB Patent Application No. 1321150.3, filed on Nov. 29, 2013 and GB Patent Application No. 1408772.0, filed on May 16, 2014, the contents of which are hereby incorporated by reference herein in their entirety for all purposes.

BACKGROUND

This invention relates to variators.

In this context, a variator is a transmission component that interconnects two rotatable elements whereby, when rotating, the two elements have rotational speeds related to one another by a ratio (referred to as the "variator ratio") that can vary between a minimum variator ratio and a maximum variator ratio in a substantially stepless manner. The invention may be embodied in a range of variator types, particularly those of the traction rolling type. Such variators may include ball bearing-and-ring type variators (such as Kopp variators), half toroidal variators, "Milner" variators and toroidal variators.

Full Toroidal Variators

The range of variators known as toroidal variators fall into two principal categories: "half-toroidal" and "full-toroidal" variators, so termed because of the toroidal (or half-toroidal) cavity that exists between input and output working surfaces of the variator. In a full-toroidal variator, each rotatable element drives a respective race within the variator, and the races rotate about a common axis (the "variator axis"). Each race has a working surface, arranged such that the working surfaces face one another in a direction parallel to the variator axis. An annular recess of arcuate cross-section is formed within each working surface, coaxial with the variator axis. The recesses are arranged such that they lie on a common hypothetical circle, the plane of which intersects the variator axis and the centre of which is in a plane (the "centre plane") that is parallel to and spaced equally between the races. By extending the hypothetical circle around the variator axis, a hypothetical torus is described, the working surfaces occupying opposite regions of the boundary of the torus. Therefore, the space between the working surfaces of the races is referred to as the "toroidal cavity". The radius of the centre of the hypothetical circle with respect to the variator axis is termed the "toroidal radius", and the radius of the hypothetical circle is termed the "minor radius of the toroid".

Typically, several rolling elements are provided within the toroidal cavity. Each rolling element is carried in a respective carriage. The rolling elements are free to rotate about a respective rolling element axis (normal to the plane of the roller) with respect to the carriage. Rotation of one of the races (called the "input race") about the variator axis causes each rolling element that is in contact with it to rotate. This in turn causes the output race to rotate in the opposite direction to that of the input race. Similarly, application of a torque to the input race about the variator axis causes a torque in the opposite sense to be applied to the output race. During such rotation, the rolling elements will make contact with the input race and the output race about a respective circular contact locus described on the respective working surfaces. If these two loci are of the same radius with respect to the variator axis, then the output race and the input race will have the same rotational speeds. However, if the radius of the locus on the input race (the "input radius") is not equal to the radius of the locus on the output race (the "output radius"), then the speed of the output race will be greater than or lesser than the speed of the input race. In general, the variator ratio (defined in this description as output speed divided by input speed) will be equal to the input radius divided by the output radius. Each carriage may be tilted such that the input and the output radii may be altered.

The variator just described may be termed a "single-roller" variator because there is only a single rolling element (albeit several may exist in parallel) in the power path between the races; typically each carriage therefore contains just a single rolling element. In the alternative case of a "twin-roller" variator, the rolling elements are arranged in pairs, and typically each carriage contains two rolling elements. Each rolling element has a race-contact rolling surface that makes contact with (subject to the discussion below) a respective working surface of one of the two races, and a roller-drive rolling surface that makes contact with the roller-drive rolling surface of the other rolling element of the pair. The race-contact rolling surface is part-spherical and the roller-drive rolling surface is frusto-conical. Rotation of one of the races (called the "input race" in this discussion) about the variator axis causes each rolling element that is in contact with it to rotate. This, in turn causes the other rolling element of the pair to rotate, which causes the output race to rotate in the same direction as the input race. Similarly, application of a torque to the input race about the variator axis causes a torque in the same sense to be applied to the output race.

Each carriage is configured such that it can be moved to alter the input and the output radii, this movement being referred to as "tilt". At least when the variator is operating in an equilibrium condition, the input and the output radii are symmetrically disposed about the toroidal radius.

This specification refers to "contact" between the working surfaces and the rolling surfaces. However, this is a simplification adopted for convenience of description. Most embodiments of toroidal variators operate using traction drive. That is to say, the working surfaces and rolling elements are at least partially immersed or coated in a traction fluid. This has the property of having a viscosity that increases rapidly when its pressure exceeds a threshold. As the races rotate, traction fluid is drawn into the nips formed between the rolling elements and the working surfaces to create a thin layer of traction fluid between the rolling surfaces and the working surfaces, so there is, literally speaking, no direct contact between them. The term "contact" as used throughout should be understood to include contact through traction fluid as well as direct contact, as the context requires.

In order to achieve a satisfactory traction drive, an end-load is applied, which urges the races towards one another along the variator axis. The end-load is optimised to balance the requirement of providing sufficient loading to produce adequate traction at the interfaces between the working surfaces and the rolling surfaces, but low enough not to compromise the efficiency and durability of the variator. In many embodiments, the races may make slight movements along the variator axis in response to the end-load.

Within the general arrangement of a single-roller and twin-roller full-toroidal variator described above, a great many variations are possible concerning control, mounting and freedom-of-movement of the carriages, number and configuration of races, number and configuration of rolling elements, and so on.

The use of the terms "input" and "output" to define the races should not be taken as a functional or structural limitation relating to these components—they are simply labels. The variator may be entirely symmetrical in operation. These will typically be chosen to provide a concise and understandable description in a particular context. For example, in the case of transmission for a vehicle, the input will typically be connected to a prime mover, and the output will typically be connected to a final drive system to indicate the normal direction of power flowing through the variator. However, it will be understood that when the vehicle is in an overrun condition, engine braking will actually cause power to flow from the output to the input of the variator.

In the remainder of this specification, the term "variator" will refer to a single-roller full-toroidal variator as described above, unless the context indicates otherwise, but it will be understood that embodiments of the invention are not limited to such variators.

VARIATOR CONTROL

There are two main strategies used to control a variator: torque control and ratio control.

Torque control has no direct equivalent in multiple-speed transmissions because it relies upon a feature arising from the nature of a variator. Torque control has been described in many publications, including those parts of WO-A-2010/070341 that relate to FIGS. 1 to 3, and will be described here only briefly, as required to enable the present invention to be understood.

Torque control relies upon the variator having several design features:
  each carriage has freedom to rotate about a reaction axis that is inclined by a small angle to the centre plane; and
  each carriage can move axially along the reaction axis against a force applied to it by an actuator.
Note that the first of these requirements means that while under torque control, tilt angle is not controlled directly by an actuator.

Each race applies a force to each rolling element that acts in a direction tangential to the working surface. Therefore, equal and opposite tangential forces must be provided by each actuator to maintain the rolling axis of the corresponding rolling element stationary along the reaction axis. If the force applied by the actuator changes, the forces acting on the carriage become imbalanced, so the rolling axes will move. The geometry of the variator is configured (using considerations that will not be discussed here) such that upon movement along the reaction axis, a couple is generated about the reaction axis that causes the carriage to rotate. This changes the tilt angle, and therefore the variator ratio, in such a way as to reduce the imbalance of forces acting on the carriage. The carriage will therefore move towards a new tilt angle at which the forces return to balance. Thus, the force applied by the actuator determines the torque that will be developed across the variator. In a torque controlled variator, the roller and carriage displacements are responsive to changes in speed ratio, tilting to accommodate the instantaneous ratio that exists across the variator.

Ratio control bears the nearest similarity to the control of a transmission with multiple discrete, spaced ratios. In a ratio-control arrangement, the roller and carriage displacements are controlled by means which are not responsive to the reaction forces experienced by the roller carriages. The carriages are moved in such a way as to directly cause the rolling axes to tilt to the angle required to achieve the target ratio.

AIM OF THIS INVENTION

In many cases where a variator is used within a transmission system to transmit drive from a prime mover to a device, there are conditions of operation in which the device does not actually need to be driven. For example, where the device is a supercharger and the prime mover is an internal combustion engine (ICE), it need not be driven if engine operating conditions do not require the supercharger's boost. Under such conditions, energy required to drive the variator and the device does not achieve a useful result, and therefore represents a loss, which can increase the overall power consumption of the system. In an ICE used to drive a vehicle, this manifests itself as an increase in fuel consumption.

It is therefore desirable to provide for the possibility of disconnecting the driven device from the driving means (for example a prime mover such as an ICE).

Conventional transmission systems usually feature a neutral state in which a driven device may be disconnected when drive to it is not required. The neutral state may be achieved using a clutch, which may typically be of the frictional type (e.g., a wet multi-place clutch) or a positively-driven type (e.g., a dog clutch). A clutch usually requires a dedicated actuator which is separate from those required to operate the transmission. Even if a clutch can be incorporated into the transmission, it will usually add to complexity, as compared with a non-clutched system.

An aim of this invention is to provide within a transmission system, means by which a neutral state, in which a driven device is operationally disconnected from its driving means, without the need to provide a separate clutch assembly or associated actuator components.

To this end, from a first aspect, this invention provides a variator comprising first and second races disposed for rotation about a variator axis, at least one rolling element disposed in a cavity between the races, wherein:
  in a drive configuration, a load is applied to clamp the rolling element between the races such that drive is transmitted between the races through the rolling element;
  in a neutral configuration, the rolling element and races are configured whereby the races can move independently of one another.

Although it is known to vary end-load within a traction drive variator in response to variation in the torque transmitted through the variator, it is generally assumed that an end-load sufficient to sustain drive through the variator with minimal slip is maintained. This invention incorporates the function of a clutch into the variator itself by operating the variator contacts in their slipping mode. Provided that the variator contact powers and temperatures are kept within acceptable bounds, then such slip and power transfer may be borne without damage.

In typical embodiments of the invention, in the drive configuration, drive is transmitted between the races through the rolling elements by the medium of a traction fluid. Most typically, a plurality of rolling elements are disposed in the cavity.

In embodiments of the invention, the variator may be caused to enter the neutral configuration by reducing end-load, which in turn reduces the contact traction (shear) forces between the races and the rolling elements towards zero. Subsequent re-application of end-load generates shear forces so returning the variator to the drive configuration.

In such embodiments, end-load may be controlled by hydraulic actuation, in which a hydraulic pressure applied to an end-load control system is varied in accordance with torque to be transmitted through the variator, or reduced to enter the neutral configuration.

Alternatively, the end-load may be applied, either in part or entirely, by a mechanical system. This latter arrangement is often the most cost-effective implementation for compact, low-cost variators due to the absence of associated hydraulic apparatus. A suitable mechanical system typically includes a cam arrangement which transmits torque through a link to one race or both races, and applies an axial end-load clamp force to the rollers that is directly related to the torque transmitted. The link typically comprises low-friction rolling elements that lie on a circumferential ramp of the cam, so that the torque and axial end-load are related mathematically by the 'tangent' of the ramp angle multiplied by the radius of the rolling elements:

Axial end-load~torque/(tan(ramp angle)*radius)

A spring in series with the cam may be included such that it pre-loads the cam, and provides a minimum end-load to the variator even when there is no torque transmitted through the cam. Alternatively or additionally, a spring may be positioned in parallel with the cam such that it adds a load to the axial load generated by the cam. In such an embodiment the spring is typically positioned between the input to the link and the driven race—that is, between driving member and the race.

A mechanical end-load clamping system may be manipulated in order to cause its energisation and de-energisation as required. These two events may be considered separately from one another.

The present invention has particular, but not exclusive, application to toroidal and especially full-toroidal variators. Such variators have a geometry whereby the rolling elements reside in a cavity whose width in the plane of the rolling element is conventionally equal to the diameter of the rolling element (plus the thickness of any layer of traction fluid). As the rolling element tilts with a change in variator ratio, the races that clamp the rolling element do not therefore move in the axial direction by a substantial distance. Thus, the locus of the tilting rolling element describes a circle present in the toroidal section.

In embodiments of the present invention, the input and/or the output race may be shaped and dimensioned to include a disconnect region, within which the rolling elements do not make contact with the or each race, the disconnect region being adjacent to that in which contact is made between the rolling elements and the race. Thus, when the rolling elements are moved to the disconnect region, the variator enters the neutral configuration.

Preferably, the disconnect region is at the low ratio end of the variator operating range, and the driven device is coupled to the output of the variator. Thus a driven device may be slowed down relative to a driving means as the variator is swept from high to low ratio, after which the driven device may be disconnected from the driving means as the variator enters the neutral configuration. The driven device is driven at its lowest speed, and the prime mover has the greatest mechanical advantage over the driven device during transition of the variator between the drive and neutral configurations. Such embodiments can act as a launch arrangement that can set a load into motion. Furthermore, such embodiments may operate to disconnect the driven device when driving it would serve no useful purpose, in order to reduce drag on the prime mover.

In the case of a toroidal variator, the disconnect region may be formed by increasing the minor toroid radius in the region of an inner contact (i.e. the 'hub' of the race) as compared with regions of the same race adjacent to it. Alternatively, the disconnect region may be formed by increasing the minor toroid radius in the region of an outer contact (i.e. near the outer periphery of a race) as compared with regions of the same race adjacent to it. Embodiments of the invention may include a stop means that operates to limit the extent to which the races can move towards one another in the direction of the variator axis, the stop means being effective to carry the end-load instead of the rolling elements. This ensures that when the rolling elements move into the disconnect region, the applied end-load is borne by the stop means rather than by the rolling elements. Thus the load clamping the rolling elements is reduced to such an extent that drive is no longer transmitted through the variator: thus, the variator is in the neutral configuration.

Typically, the tilt angle is not changed directly, but instead changes in response to a change in forces acting between the races and the rolling elements. This is often referred to as a rolling element steering effect because the rolling elements are steered (tilted) by the races. However, when the variator is in the neutral configuration, there is little or no normal contact force reacted between the races and the rolling elements, so the usual mechanism by which tilt angle is changed is unavailable. Therefore, re-engagement means must typically be provided to enable the variator to change from the neutral to the drive configuration. Typically, the re-engagement means operates by directly moving the rolling elements to change the tilt angle. To enter the drive configuration, the rolling elements must cause the races to move apart against the end-load in order to accommodate the rolling elements between them. Thus, it is preferable that the rolling elements can act on the races with sufficient mechanical advantage to allow use of a low-force actuator to control the rolling elements. The races may include formations that are shaped to increase the force or the mechanical advantage that the rolling elements can exert on the races. Such formations may include a ramp formed in a working surface of the race or races.

Embodiments of the invention may be controlled using ratio control, as discussed above. In preferred ratio-controlled embodiments of the invention, the races have an input surface and an output surface, and a toroidal cavity being defined between the input and output surfaces; a rolling element being disposed between and being in driving engagement with the input and the output surfaces at respective contact regions, the rolling element being mounted on a carriage assembly for rotation about a rolling axis, the rolling element being free to pivot about a tilt axis, the tilt axis passing through the rolling element perpendicular to the rolling axis, and intersecting the rolling axis at a roller centre, whereby a change in the variator ratio being the ratio of rotational speeds of the races occurs with a change in tilt angle; wherein the rolling element may undergo pivotal movement about a pitch axis, the pitch axis passing through the contact regions; the pivotal movement about the pitch axis changing the pitch angle, so urging the rolling element to pivot about its tilt axes and thereby providing a change in variator ratio. This arrangement for controlling the variator is referred to as "pitch steer".

In such embodiments, pitch steer control may be used to cause the rollers to tilt towards the disconnect region such that the variator enters the neutral configuration.

While in the neutral configuration, a change in the pitch axis will not in itself cause the roller to steer back into the engaged region so that the variator enters the drive configuration. Alternatively therefore, a change in the pitch axis of a carriage can be made to cause a contact part of a carriage (e.g., a lobe) or a contact part fast with a carriage to come into contact with a formation fixed (or substantially fixed) with respect to a casing of the variator, such contact urging the carriage to directly change its tilt angle and thereby bring the roller associated with the carriage into operative driving contact with the races, and thereby re-establish the drive configuration of the variator.

The formation may be fixed (or substantially fixed) to the reaction member, variator main shaft, or other components of the variator such that it can exert the required force on the carriage to urge it towards the drive configuration.

The contact part (for example the lobe) is on the side of the carriage that urges the roller towards the drive configuration when the pitch input urges the carriage towards the drive configuration (or would do if there were contact between races and rolling element).

Where there is a castor axis, the contact part is offset from the castor axis such that the formation exerts a precessing couple on the carriage when the pitch input acts to move the carriage towards the drive configuration (or would do if there were contact between races and rolling element).

Where the pitch steer variator has a cam steering arrangement in which pitch and ratio angle are related by a profile of the cam, or in the case of a torque controlled variator in which translation, pitch and ratio angle are related by a profile of the cam, there is an equivalent (or virtual) steering axis about which the carriage is constrained to precess. In this case the contact part is offset from the equivalent steering axis such that the formation exerts a precessing couple on the carriage when the pitch input acts to move the carriage towards the drive configuration (or would do if there were contact between races and rolling element).

When the carriage is pitched by the control member, a first portion of the carriage moves radially away from the variator axis and a second portion moves radially closer to the variator axis. The contact part may be on either first or second carriage portions, and offset from the castor axis or equivalent steering axis.

The contact part and/or the fixed formation may be radial of a rolling element with respect to the variator axis. The contact part and/or fixed formation may be radially inboard (towards the variator axis) or radially outboard of the rolling element with respect to the variator axis.

The contact part may be radial from the pitch axis such that the formation makes contact with the carriage at a point that translates as the carriage is pitched by a control member.

In the embodiment in which both carriages are actuated one side of a plane that includes the variator axis, and where there are two carriages in the cavity, preferably the contact part and/or formation is radially outboard of the first carriage, and radially inboard of the second carriage with respect to the variator axis.

In embodiments, the drive configuration may be re-established while at least one race of the variator is rotating. Alternatively, the rolling elements may be moved to a position in which drive mode can be re-established while the variator is not in motion or not being driven.

A variator embodying the invention may include a single toroidal cavity. Alternatively, it may include two or more cavities with associated rolling elements and other components. In embodiments that include a plurality of cavities, each may be substantially identical, such that each can enter a neutral configuration. Alternatively, just one or not all of the cavities may be capable of entering a neutral configuration.

From a second aspect, this invention provides a drive system that includes a prime mover, a variator according to the first aspect of the invention that has one race connected to an output of the prime mover, and a driven device connected to the other race of the variator.

Alternative embodiments may alternatively or additionally operate such that the driven device is driven by the variator at a maximum ratio immediately prior to the variator entering the neutral configuration from the drive configuration. Such an arrangement can be used to prevent over-speed of the driven device.

In typical installations of a drive system, the prime mover is an internal combustion engine, and the driven device is an ancillary device, such as an ancillary device within a motor vehicle. A particular application of an embodiment of the invention includes a supercharger arranged to deliver air to an inlet of the internal combustion engine. A supercharger is required to produce high air delivery and high boost pressure only when a driver's actions request high engine output power. As high air flow is only required from the supercharger at certain times, it may be beneficial to selectively disconnect the driving means from the supercharger in order to reduce losses when increased airflow is not required. Such a drive system may be configured to operate such that the variator is always in the drive configuration when the speed of the internal combustion engine exceeds a threshold. Advantageously, this ensures that the driven device will not be engaged using the variator contacts above a threshold engine speed, this threshold corresponding with a functional limit of the variator above which launch of the driven device may cause such slippage as to cause damage of the race or rolling element surfaces.

The supercharger may include a compressor of a number of different types, including, but not limited to, a dynamic compressor (such as a centrifugal compressor) and a positive-displacement compressor. The drive system may further include a speed-increasing stage that operates to increase the speed of the drive input to the supercharger. The speed-increasing stage may include an epicyclic, in particular, a traction epicyclic.

Alternatively, an embodiment of the invention may be used to drive (among other devices) an oil pump, a water pump, an electrical generator or alternator, or an air-conditioning compressor.

In a particular embodiment, the variator may comprise a traction drive variator with a single cavity, this typically requiring thrust bearings that bear the end-load whilst accommodating the difference in speeds between the input and output races. In this embodiment, the losses in the variator comprise both contact losses and losses arising from the thrust bearings.

In a further application, an embodiment of the invention may be used within a drive system for a flywheel that is used to store energy for subsequent recovery to do useful work. For example, the flywheel may store kinetic energy recovered from deceleration of a vehicle (a so-called "kinetic energy recovery system" or "KERS"). A flywheel drive system is required to exchange energy only intermittently (for example, when braking or when accelerating)—when cruising or when stationary there is no such requirement. It would therefore be beneficial to disconnect the driving means from the flywheel when energy exchange to or from the flywheel is not required, thereby reducing losses in the flywheel transmission.

From a third aspect, this invention provides a method of operating a variator optionally embodying the first aspect of the invention comprising first and second races disposed for rotation about a variator axis, at least one rolling element disposed in a cavity between the races; in which method, in a drive configuration, drive is transmitted between the races and the or each rolling element; and in a neutral configuration, the or each rolling element and races are configured whereby the races can move independently of one another; in which the neutral configuration is obtained by moving the or each rolling element to a position in which it ceases to make contact with at least one of the races.

From a fourth aspect, this invention provides a method of operating a variator optionally embodying the first aspect of the invention comprising first and second races disposed for rotation about a variator axis, at least one rolling element disposed in a cavity between the races; in which method, in a drive configuration, drive is transmitted between the races and the or each rolling element; and in a neutral configuration, the or each rolling element and races are configured whereby the races can move independently of one another; in which the drive configuration is obtained by moving the or each rolling element to a position in which it makes contact with both of the races.

Optional and preferable features of the first aspect of the invention may be applied to the second and to the third aspects of the invention.

An embodiment of the invention will now be described in detail, by way of example, and with reference to the accompanying drawings, in which:

FIGS. 4a, 5a, 6a and 7a show several alternative configurations of a race being a component of an embodiment of this invention together with their contacting rolling elements.;

FIGS. 4b, 5b, 6b and 7b show enlarged details A, B, C and D of FIGS. 4a to 7a, respectively;

Figure 14:
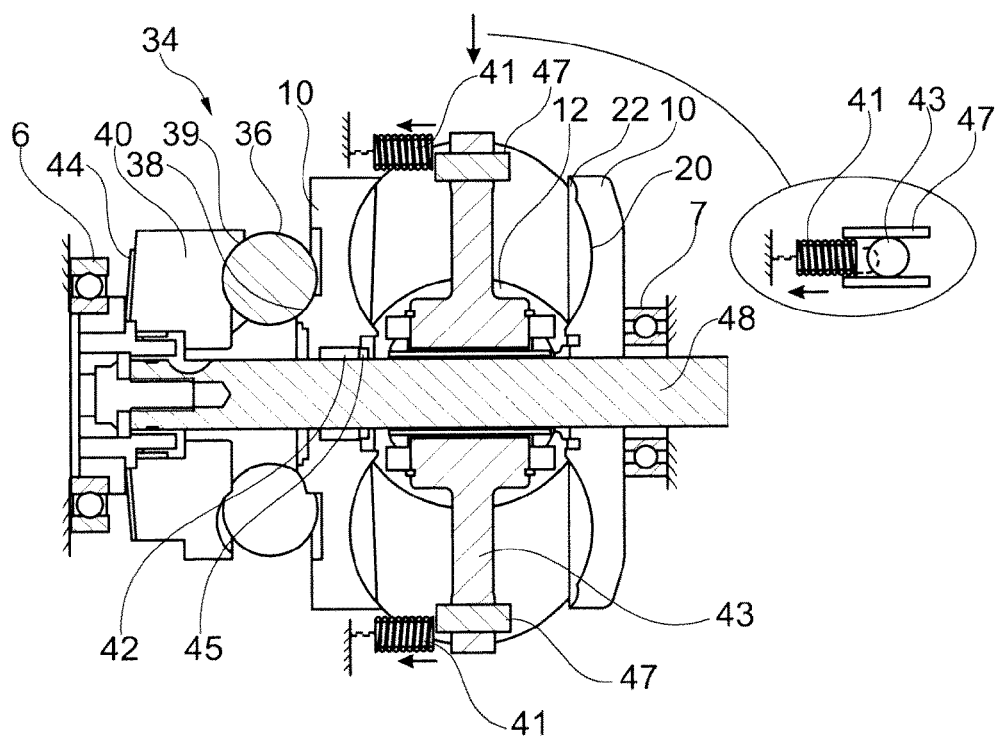
FIG. 14 shows a section through a variator embodying the invention.

With reference to the drawings, a variator embodying the invention includes first and second races that serve as input and output elements for the variator. In FIG. 14 two races are shown, but in all other drawings, just one race 10 is shown. Each race is shaped generally as a disc, and is mounted for rotation about a common variator axis A-A. Two rolling elements 12 are disposed between the races 10 to transmit drive from one race to another through the intermediary of traction fluid. Each rolling element 12 is carried for rotation on a respective carriage 14, each carriage being free to move to vary a tilt angle of the rolling element 12. The ratio of rotational speed of the races 10—the variator ratio—is determined by the tilt angle of the rolling elements 12. An end load is applied to urge the races 10 towards one another, thereby clamping the rolling elements with a force sufficient to transmit drive between the races and the rollers through the traction fluid.

End load can be applied using one of many arrangements well-known to those skilled in the technical field. These may include, but are not limited to, a single hydraulic endload piston, or alternative arrangements, for example as disclosed in GB-A-2 438 412 or WO-A-2011 051702.

Figure 1:
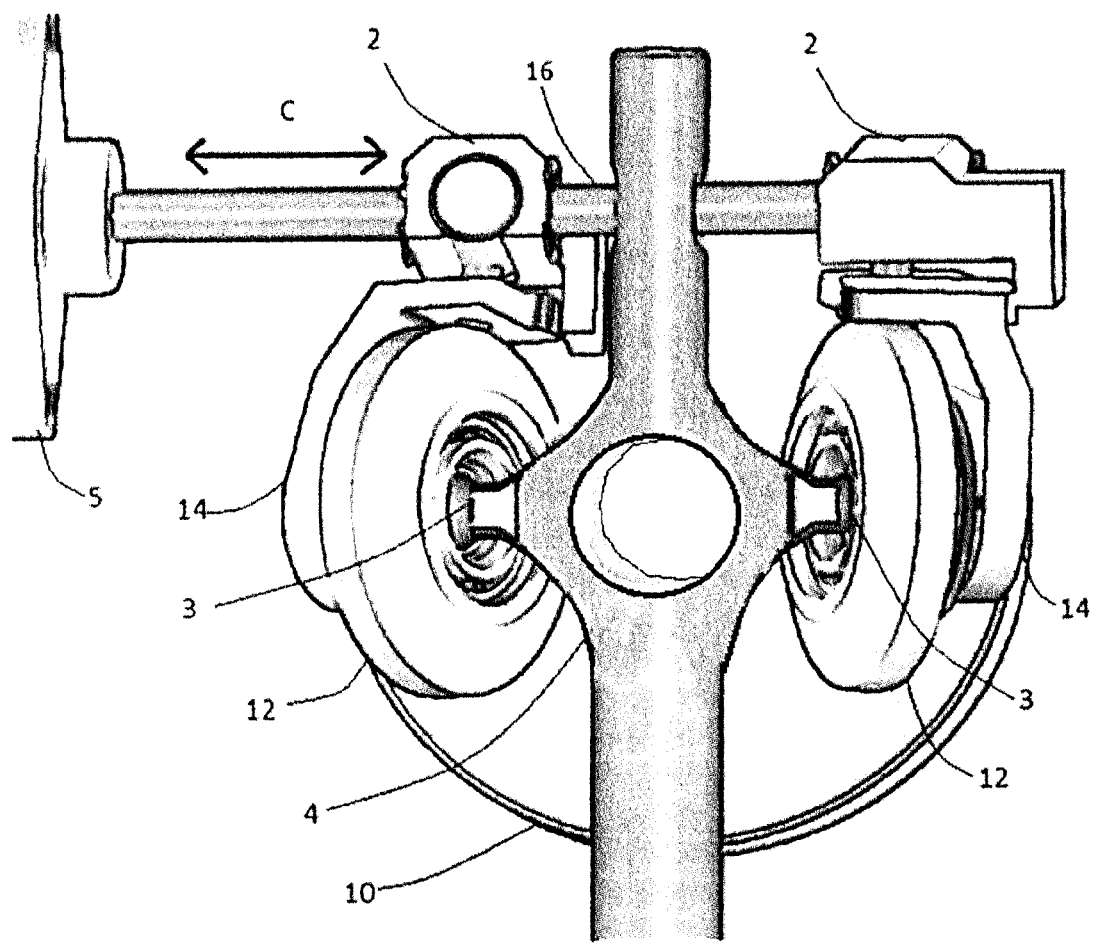
FIG. 1 shows parts of a variator being an embodiment of the invention.
Figure 2:
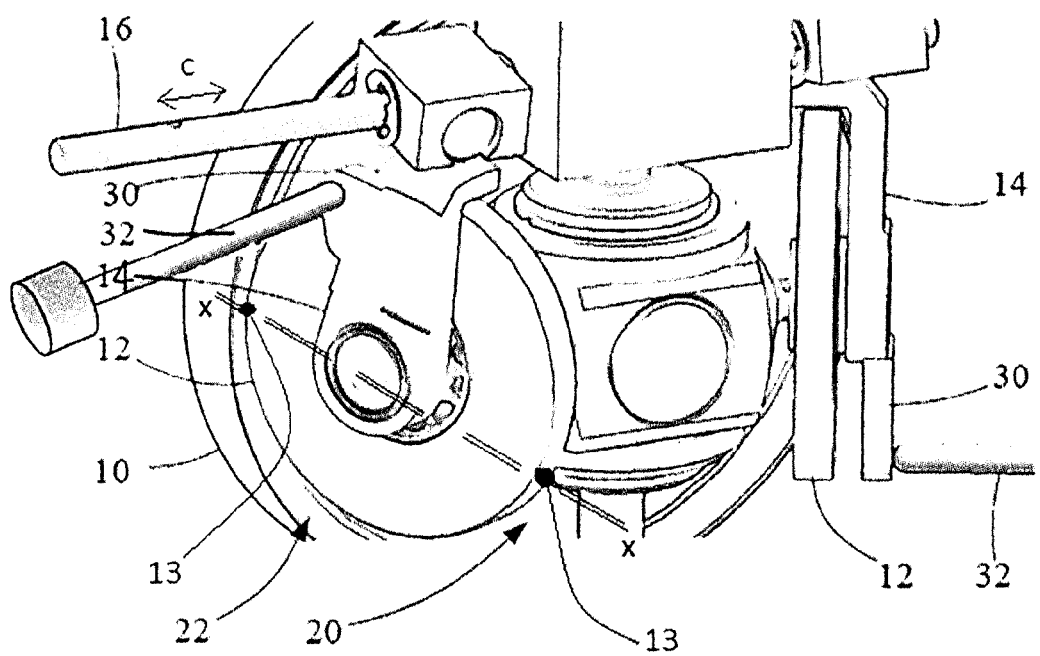
FIG. 2 shows a detail of a variator that implements means for re-engagement of drive through the variator.
Figure 8:
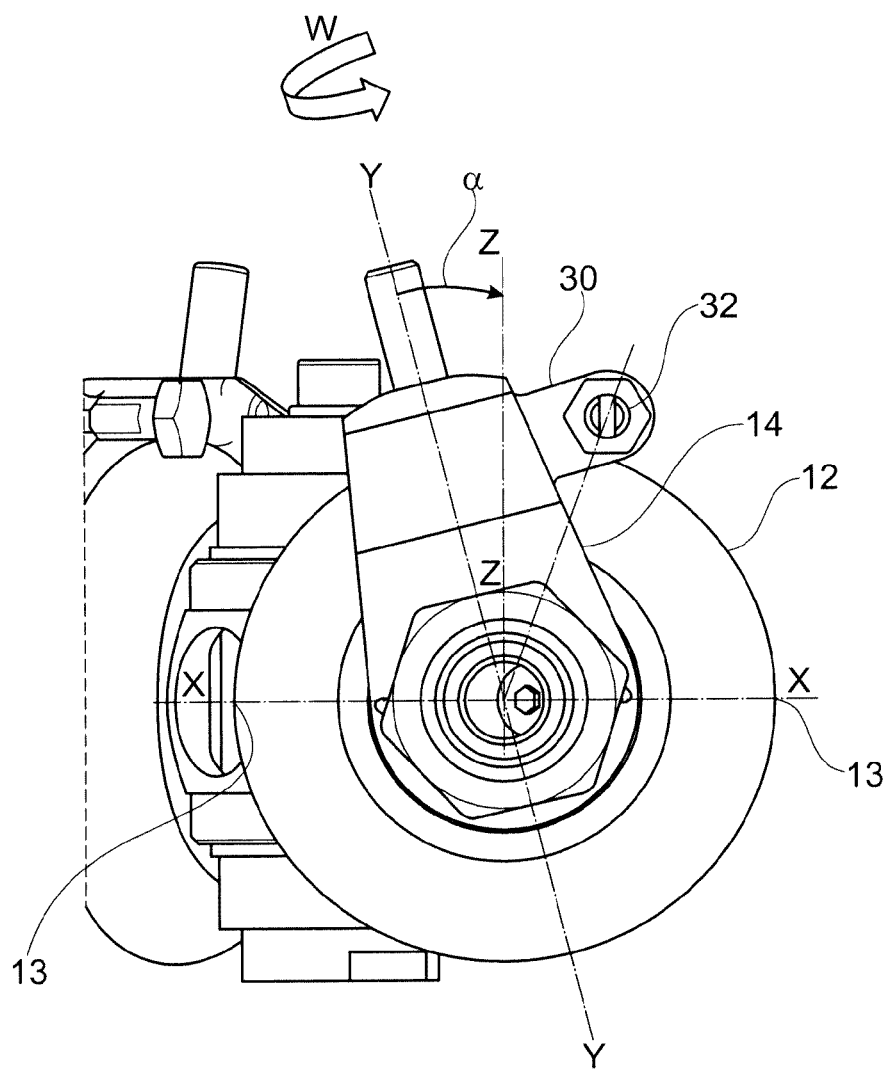
FIG. 8 shows a further alternative embodiment of the invention.

In this embodiment, the tilt angle, and therefore the variator ratio is controlled using the mechanism of "pitch steer", as disclosed in GB-A-2 499 704 and other applications of the present applicant. Each carrier 14 is carried on an actuating shaft 16 that can be driven axially by an actuator 5, thereby causing the rolling elements 12 to undergo pivotal movement about a pitch axis, such axis passing through the race-roller contact regions 13 as shown in FIGS. 2 and 8. Such pivotal movement requires little effort and therefore this control arrangement offers the advantage that the actuator 5 size and cost is low. Pitching of the roller causes an angle (termed the 'steering angle') to be generated between the local linear velocities of the race and rolling element in the regions of each contact 13. With reference to FIG. 8, the rolling elements 12 are constrained to precess about a castor axis Y-Y that is inclined by angle 'α' to the toroid centre plane (an axis lying in said plane is shown by axis Z-Z). As the rolling element precesses about the castor axis Y-Y, it undergoes two modes of angular change: (i) tilt, which causes the position of the contact regions 13 to move relative to the variator axis A-A, and therefore the variator ratio to change, and (ii) a pitching motion which cancels the steering angle generated as a result of the initial input by actuator 5. The rolling elements 12 thus precess in response to an input by the actuator 5, and the ratio angle changes until the steering angle is cancelled; each pivotal input to the rolling element 12 thus results in a corresponding ratio angle for the rolling element 12 and a particular variator ratio. Movement of the shaft 16 in a first direction tends to increase the variator ratio, while moving it in the opposite direction tends to decrease the variator ratio (such direction indicated by letter 'C'). However, it should be understood that the principles of operation of the invention can be applied to variators that use alternative arrangements of components and control mechanisms, including, but not limited to, the arrangements disclosed in WO-A-2011 067602 or WO-A-2007 065900.

To the extent described above, the arrangement of the variator is known, and details of the construction of the variator that are contained within the state of the art will not be described in detail.

Figure 3:
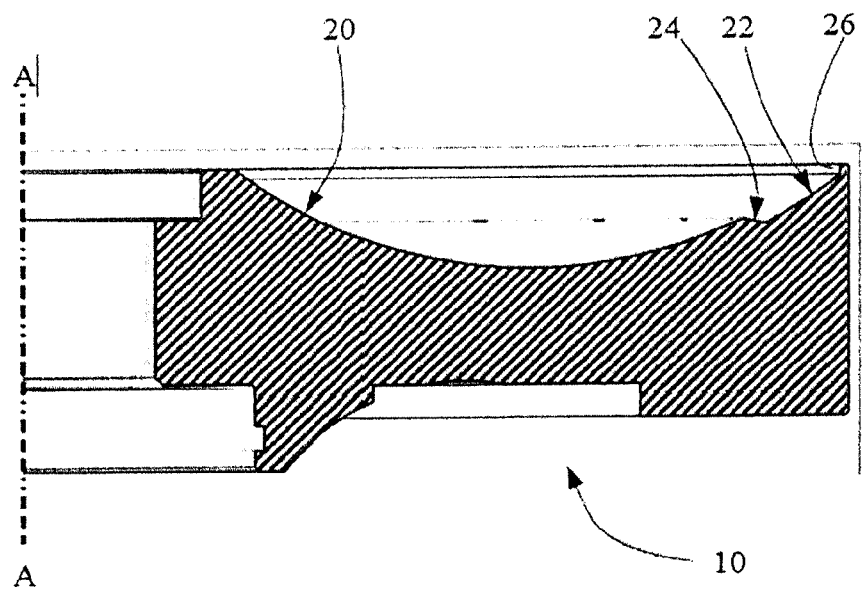
FIG. 3 is a cross-section through a race being a component of the variator of the preceding figures.

As compared with a conventional variator, at least one race 10 of this embodiment has a modified shape, as will now be described, with reference to FIGS. 3, 4a and 4b.

As is conventional, the race 10 has a working surface that has a working region 20 that lies within the working surface that is coaxial with the variator axis A-A. In this embodiment, there is an extension of the working surface radially outwardly from the variator axis A-A that forms a disconnect region 22. The disconnect region 22 lies within the working surface that is coaxial with the variator axis A-A, the minor radius of the disconnect region 22 being greater than that of the working region 20. The working region 20 and the disconnect region are interconnected by a ramp 24 that provides a smooth transition between the working region 20 and the disconnect region 22. A limiting wall 26 projects from and surrounds the periphery of the disconnect region 22.

When the rolling elements 12 are moved to a tilt angle such that they make contact with the working region 20 through the medium of a traction fluid, the variator operates in a manner substantially identical to a conventional toroidal variator. This is referred to as the drive configuration. If the rolling elements 12 are moved to a tilt angle such that they are adjacent to the disconnect region 22, drive is not transmitted between the rolling elements 12 and the races 10, thereby allowing the races 10 to rotate independently of one another. This is referred to as the neutral configuration.

In the neutral configuration, the end load causes the races to move towards one another along the variator axis A-A to a limiting position. In the limiting position, the rolling elements 12 do not make forcible contact with the disconnect region 22. This has two consequences: (i) drive is not transmitted from the race 10 to the rolling element 12, and (ii) the rolling element is unable to be 'steered' by the races to a desired tilt angle, thereby removing control of the tilt angle of the rolling element. Tilt of the rolling elements 12 is maintained within a range that ensures they are adjacent to the disconnect region by the presence of the ramp 24 and the limiting wall 26.

FIGS. 5*a* and 5*b* show a modification of the embodiment described above. Instead of the working region 20 and the disconnect region 22 being interconnected by a ramp, there is a smooth transition between them, with a gradual increase in the minor radius of the torus that defines the working surface. In such an embodiment, as the rolling element moves between the disconnect ratio 22 and the working region 20, the clamp load increases gradually. This has the effect of gradually increasing torque that can pass through the variator as it changes from the neutral configuration to the drive configuration, which can be used to control the amount of load that is borne by the variator, for instance during launch of an inertia of a system to which drive is being transmitted.

In an alternative configuration shown in FIGS. 6*a* and 6*b*, the disconnect region is omitted from the races 10, which consequently closely resemble those in a conventional variator. In such embodiments, the neutral configuration is achieved by moving the rolling elements 12 to a position in which they are beyond the radially outward edge of the races. This offers the advantage that drag losses due to rubbing between the rolling elements and the races are minimised in the neutral configuration, and the diameter of the races is potentially less than in other embodiments.

FIGS. 7*a* and 7*b* show a modification to the arrangement of FIGS. 6*a* and 6*b*. In this embodiment, the race 10 has a peripheral lip 36*a*. The lip 36*a* provides a peripheral ramp on the race 10. In the neutral configuration, the rolling element 12 is substantially free from the race 10, thereby providing the advantageous low drag of the preceding embodiment in the neutral configuration. The presence of the ramp allows the rate of re-establishment of drive through the variator to be controlled, as in the arrangement of FIGS. 4*a* and 4*b*.

The lack of any operational roller steering mechanism when the variator is in the neutral configuration also gives rise to a requirement for a mechanism to enable the variator to resume the drive configuration.

Figure 9:
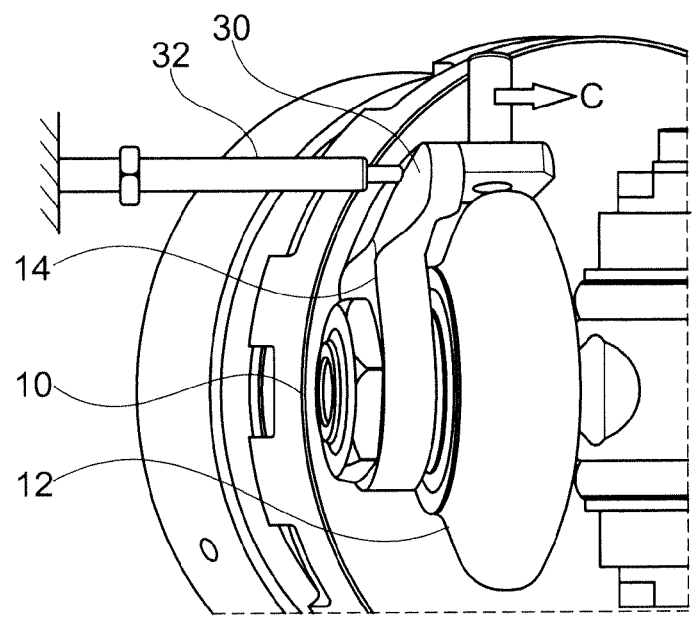
FIG. 9 shows the variator of FIG. 8 in an engaged (drive) configuration approaching the disconnect region.
Figure 10:
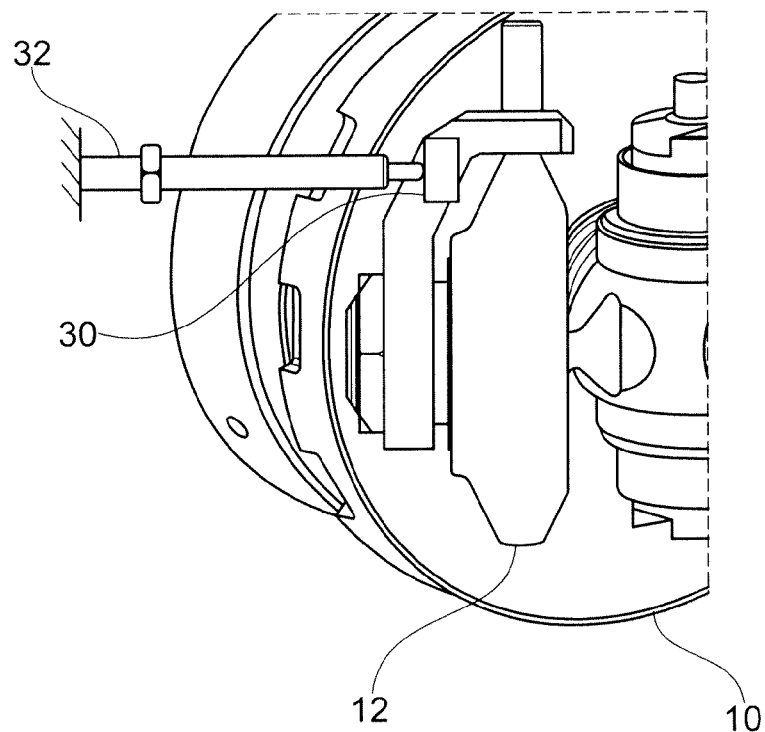
FIG. 10 shows the variator of FIG. 9 in a neutral configuration.

The following description makes reference to FIGS. 2 and 9 to 12. In this embodiment, the re-engagement mechanism comprises a respective lobe 30 that projects from each of the carriers 14 and a corresponding pin 32 that is fixed with respect to internal components of the variator. The sequence of dis-engagement of the variator, and subsequent re-engagement will now be described with reference to FIGS. 9 to 12. FIG. 9 shows the rolling elements 12 being pitched by movement of the upper part of the roller carrier in direction C, this movement being supplied by the actuator 5 (not shown). This causes the roller to pitch about an axis passing through the contact regions, such that they are steered to a new precession angle, this precession angle corresponding with an increased tilt angle and a new lower variator ratio. At a threshold rolling element 12 tilt angle, the rolling elements lose contact with the working region and become adjacent to the disconnect region of one of the races (not shown), thus causing the variator to enter the neutral configuration. The lobe 30 rests against the pin 32 in the neutral configuration.

Figure 11:
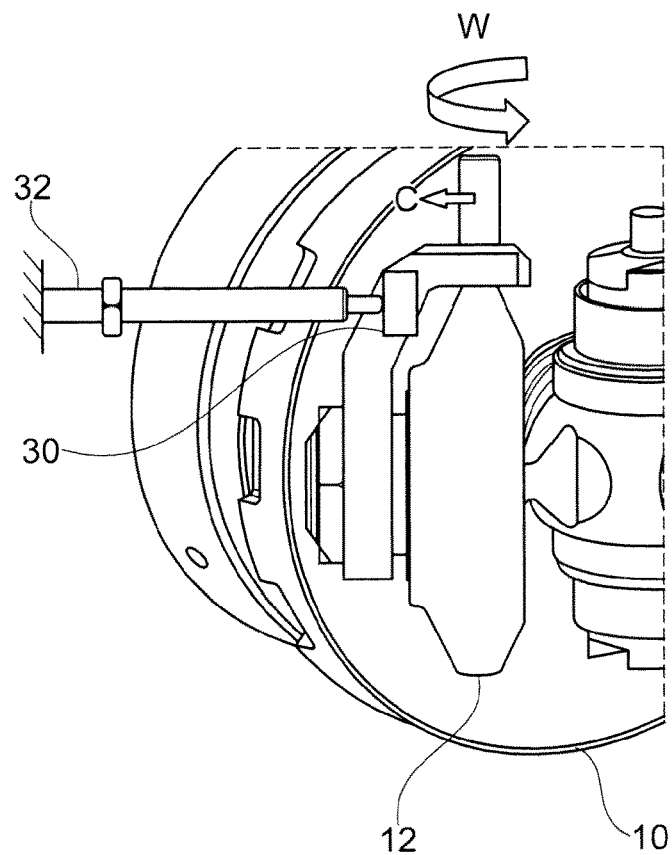
FIG. 11 shows the variator of FIG. 10 being actuated so as to undergo re-engagement.

Movement of the shaft 16 in the direction that tends to increase the variator ratio, as shown in FIG. 11, brings the lobe 30 firmly into contact with the pin 32. This applies a torque to the carrier 14 through the lobe 30 that causes a direct change in tilt angle of the carrier 14, moving the rolling element 12 from the disconnect region 22 towards the working region 20. As the rolling element 12 moves across the ramp 24, the races 10 are urged apart along the variator axis A-A, which re-establishes the end load, clamping the rolling elements 12 between the races, and thereby re-establishing drive though the variator.

Figure 12:
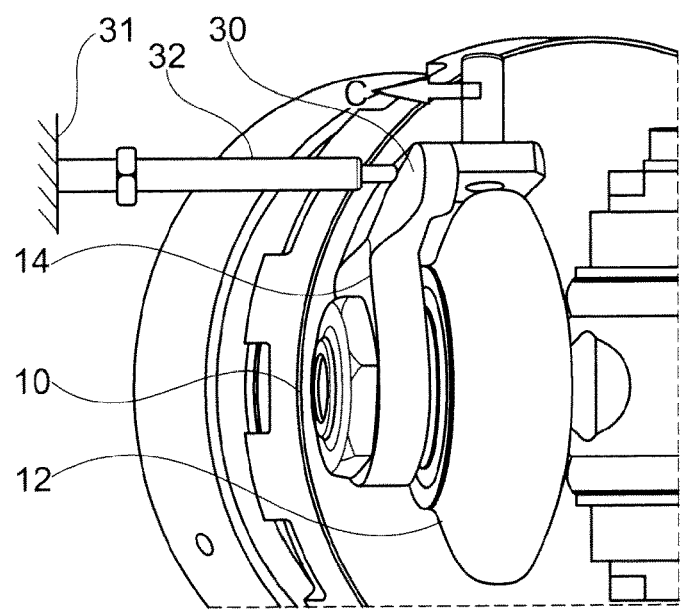
FIG. 12 shows the variator of FIG. 11 being actuated so as to move away from the disconnect region.

Further movement of the shaft in the direction 'C as shown in FIG. 12 causes the rolling element 12 to steer to a higher ratio, and as it does so the lobe 30 moves away from pin 30. The rolling element 12 is steered by the races 10 and the variator is in the drive configuration.

When the variator is set to a ratio other than 1:1, the rolling elements 12 make contact with one race 10 at a radius that is less than the other race. The race 10 that is contacted at a lesser radius will be referred to as the "inner contact disc", and the other race will be referred to as the "outer contact disc".

Embodiments of the invention may be configured such that when the variator is in the neutral condition, contact between the rolling elements 12 and the inner contact disc is maintained, such that the rolling elements 12 run against the inner contact disc. To achieve this, biasing means 41 is provided to urge the rolling elements 12 against the appropriate race 10. This may be achieved by urging the rolling elements 12 themselves or by urging the rolling element carrier 43 towards the race along axial guides 47. The inner contact may be on the input or output race, but is preferably on the input race (thus at low end of variator ratio) in a system in which the input is connected to a drive source and the output is connected to a driven load, such as a supercharger compressor. The biasing means may include a spring. An axial limiting stop 45 bears the endload when the races move towards each other in the neutral configuration.

In some embodiments, the disconnection and re-connection of drive in a variator may work most predictably if a non-self-energising mechanical end load means is energised when the rolling elements are being re-engaged with the discs. This causes the end load to be applied directly as a function of the roller tilt rather than as a function of the torque appearing across the variator. Therefore, the end load is preferably controlled during re-engagement between the rolling elements and the races through the control of tilt itself (and the preferable means of controlling the tilt is through the action of the lobe 30). Once the critical 'launch' phase is complete—that is, when the rolling elements 12 are in driving engagement with the races 10—then a self-energising endload system, such as a ball and ramp or any other system as known from their use in conventional variators, may be made to come into operation. This is typically made to happen by manipulating the ratio (by manipulating the input to the rolling elements that request the roller tilt angle) such that increased torque is generated, which in turn causes the end load self-energising mechanism to generate higher endload than the non-self-energising mechanism. Thus, the self-energising mechanism dominates over the non-self-energising mechanism if the two end load mechanisms are arranged in series with one another. Preferably, the non-self-energising means includes a spring such as a Belleville spring, and the self-energising means includes a cam that comprises rolling elements as described earlier. Preferably, the cam and spring are arranged in series so that the spring dominates and determines the end load during the launch phase, and the cam dominates and determines the end load when in the drive configuration. More preferably, the end load biasing means comprises a cam on the input, a cam on the output and a spring such that all three are in series with one another. In such an arrangement, the spring may be operative during the launch phase (and under low or zero torque conditions), and the cams (one of which tends to dominate and determine the end load towards one end of ratio whilst other tends to dominate and determine the end load towards the opposite end of ratio) may be made to approximate a hydraulic end load system, providing a traction coefficient that is approximately constant over the operating envelope of the variator. This generally provides good efficiency and durability.

A typical application of an embodiment of this invention is in providing a variable-ratio drive to a supercharger, in which a toroidal variator is coupled to a crankshaft of an internal-combustion engine, and also coupled to a compressor (such as a screw pump, lobe pump or impellor) which forces air into the intake manifold of the engine. A reduction in fuel consumption may be achieved by disconnecting the variable drive system (except the variator input disc) from the crankshaft when the pressure boosting function is not required, by placing the variator into the neutral configuration. A control system of the variable-ratio drive can achieve the neutral configuration by extending the range of operation of the variator past a minimum driving variator ratio into the neutral configuration.

Figure 13:
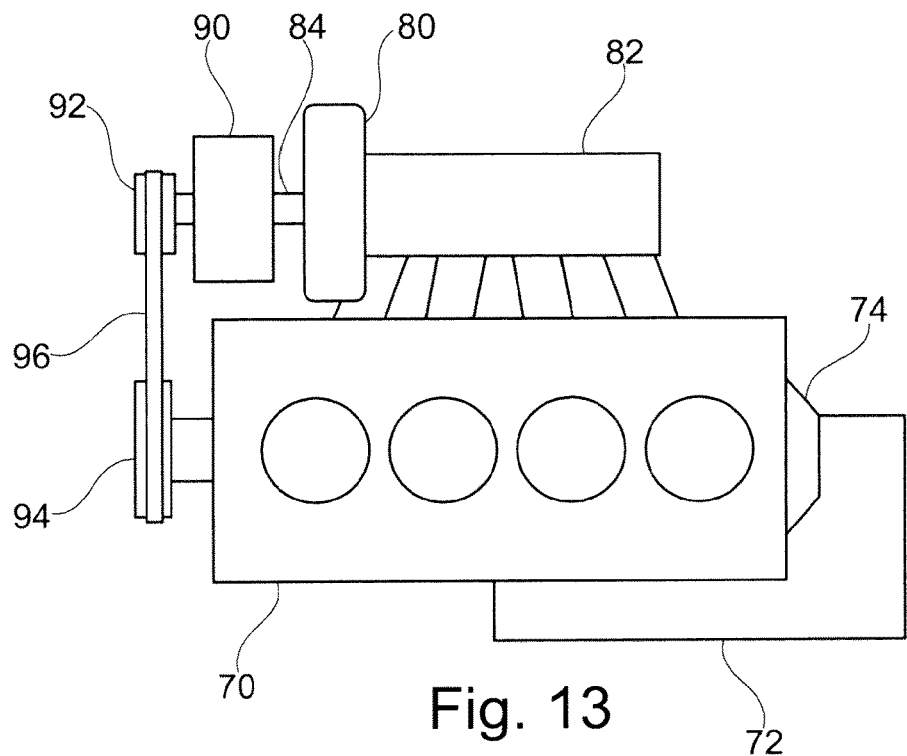
FIG. 13 shows diagrammatically an installation of a supercharger on an internal combustion engine that includes a drive system incorporating a variator embodying the invention.

With reference to FIG. 13, a drive system for a vehicle, such as a passenger car, comprises an internal combustion engine 70, normally fuelled by petrol or diesel fuel, but alternatively by liquid petroleum gas, ethanol, or a variety of other combustible fuels. A main drive from the engine 70, typically derived from an output at one end of a crankshaft, is connected to an input of a variable-speed vehicle transmission 72, typically through a coupling 74 such as a friction clutch or a torque converter. The variable-speed transmission 72 may be continuously-variable between a minimum and a maximum ratio, or may have a plurality of discrete ratios, and may be controlled manually by a driver or automatically. In embodiments where the transmission 72 is continuously-variable, it may have a "geared neutral" ratio, at which its output is stationary irrespective of the speed of its input. In such embodiments, the coupling 74 may be omitted. The output of the transmission 72 is connected to the input of a final drive system that, in turn, transmits drive to road wheels of a vehicle. The final drive system may drive two wheels of a vehicle (two front wheels or two rear wheels) or may drive all wheels of a vehicle, typically splitting drive through a transfer box.

The above describes just a range of typical configurations of a drive system that may embody the invention. Other arrangements are possible, using different arrangements of variable-speed transmission or final drive, and the drive system may be incorporated into a drive in a large range of applications where an internal combustion engine is a prime mover.

The internal combustion engine 70 has an induction system that has a supercharging arrangement. The supercharging arrangement comprises a supercharger compressor 80. The supercharger compressor 80 draws in air through an intake at approximately ambient atmospheric pressure, and delivers air to an inlet manifold 82 of the engine 70 at a pressure that is greater than the pressure at the intake by a pressure difference that depends upon the speed of rotation of a drive shaft 84 of the supercharger 80. Air that passes through the supercharger 80 normally also passes through an air filter and an air-flow meter, and, in the case of a spark-ignition engine, a throttle body. Any or all of these components can be disposed either downstream or upstream of the supercharger 80.

The drive shaft 84 of the supercharger is driven from the crankshaft of the engine 70 from an output shaft of a variable-speed drive unit 90. The drive unit 90 has an input shaft that is driven by the crankshaft of the engine 70. In this embodiment, the input shaft of the drive unit 90 carries a pulley 92 that is connected through a drive belt 96 to a crankshaft pulley 94 that is carried on one end of the crankshaft of the engine 70. The drive belt 96 may also drive other ancillaries, such as an alternator, an air-conditioning pump, a power steering pump, etc.

The purpose of the drive unit 90 is to ensure that the drive shaft 84 of the supercharger compressor 80 is turned at a speed that most nearly approaches an optimum for any given condition of operation of a vehicle drive system. As drive is taken from the crankshaft of the engine 70 to the drive shaft 84 of the supercharger 80, there are three principal stages at which the speed of drive is changed. First, the drive from the crankshaft will drive the input shaft of the drive unit 90 at a speed ratio $R_1$; second, within the drive unit 90, there is a fixed ratio stage $R_2$; and third, within the drive unit, there is a variable ratio stage $R_V$, such that the instantaneous speed $\omega_s$ of the drive shaft 84 of the supercharger 80 is calculated from the speed of the crankshaft $\omega_c$ by $\omega_s = \omega_c R_1 R_2 R_V$. Since $R_1 R_2$ are constants that are calculated as part of the design of the drive system, control of the drive system involves calculating instantaneous optimal value of $R_V$, and causing the variable-ratio stage to operate with a ratio of value $R_V$.

In embodiments that are particularly, but not exclusively, for use with centrifugal superchargers, the variable ratio stage $R_V$ of the drive unit comprises a ratio-controlled full-toroidal variator embodying the invention, such as those described above, and the fixed ratio stage $R_2$ comprises a traction epicyclic drive. Thus, the input shaft of the drive unit 90 drives the input to a variator, the variator has an output that drives the input to an epicyclic, and the epicyclic has an output that is connected to the drive shaft 84 of the supercharger compressor 80.

Function of a transmission system incorporating a variator embodying the invention may be enhanced further through the use of control strategies that limit inertial torque disturbances to the crankshaft and also control or limit slip in the variator, thereby reducing heat generation and wear in the variator contacts, during transition from the neutral configuration to the drive configuration. These strategies reduce torque disturbances at the crankshaft thereby improving driveability, and increase variator life respectively. Such control strategies include specification of a threshold engine speed above which the supercharger is to be kept engaged. At high engine speeds, the impact of re-engagement upon the slipping variator contacts may cause degradation in durability or driveability. However, the majority of vehicle operation may be at lower engine speeds, this having the largest influence on average fuel economy of the vehicle. The ability to dis-engage the supercharger, and thereby reduce parasitic losses in the variator below a threshold engine speed, is therefore particularly useful in improving real-world fuel economy. Thus supercharger boost is available at all engine speeds, but fuel economy under normal driving conditions may be enhanced.

An embodiment of a variator according this invention with non-self-energising end load means, self-energising end load means and roller biasing means is shown in FIG. 14. Tensile springs 41 bias the rolling element carrier 43 such that the rolling elements bear lightly against the inner contacts (i.e. against the input disc at a low ratio). It has been found using simulation techniques that slipping the outer contacts (output race contacts at a low ratio) during re-engagement results in cooler predicted contact temperatures than if the input contacts were slipped. Thus it is advantageous to bias the rolling elements towards the inner contact on the input race when the variator is in the neutral configuration. The self-energising end load mechanism 34 includes a circumferential ramp on the back of the input race 10, a circumferential ramp 39 on the input member 40 and between these ramps a set of ball bearings 36 arranged circumferentially around the race 10 and input member 40. The input member 40 transmits a torque through the ball bearings 36 to the race 10, from where torque is transmitted through the rolling elements 12 to the output race 10. The input member 40 may rotate relative to the input race 10, and the end load generated is a function of and typically proportional to the torque transmitted by this ball and ramp cam mechanism. End load is generally reacted at each end of the variator by thrust bearings 6 and 7 which are grounded to the casing. A disc spring 44 bears on the input member 40, clamping the rolling elements 12 between the races 10 with a pre-load force when the end load generated by the ball and ramp mechanism 34 is lower than the pre-load force of the disc spring 44. When the end load generated by the ball and ramp mechanism 34 exceeds that of the disc spring 44 then the disc spring is overcome, the input member 40 is pushed backwards, and the end load is determined by the torque transmitted through the ball and ramp mechanism 34.

When the variator enters the neutral configuration the races 10 tend to move closer together. The pre-load disc spring 44 bears against the input member 40 which bears against the ball and ramp mechanism 34, thus pushing the input race 10 against a spacer 42 which in turn bears against the limiting stop 45, this reacting the disc spring pre-load into the variator mainshaft 48. Thus the input race 10 is retained on the mainshaft 48, and end load is not transmitted to the rolling elements 12. The output race 10 is retained on the mainshaft by a clip or snap-ring (not labelled). When the rolling elements 12 are made to move into the drive region 20 (as described earlier) the input race 10 is moved away from the spacer 42 so that an axial gap opens up between the rear of the input race 10 and the spacer 42, and the disc spring 44 is compressed axially according to the degree of roller tilt as the roller 12 transitions from the disconnect region 22 into the drive region 20. When sufficient torque is generated across the ball and ramp mechanism 34 then this mechanism generates an end load that exceeds that supplied by the disc spring 44, and the spring 44 is overcome and becomes fully compressed, the ball and ramp mechanism 34 now determining the end load.

Figure 15:
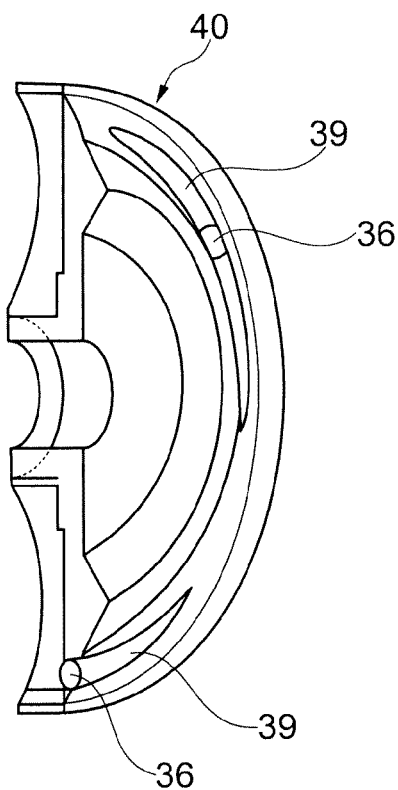
FIG. 15 shows a self-energising axial loading device according to one embodiment of the invention.
Figure 16:
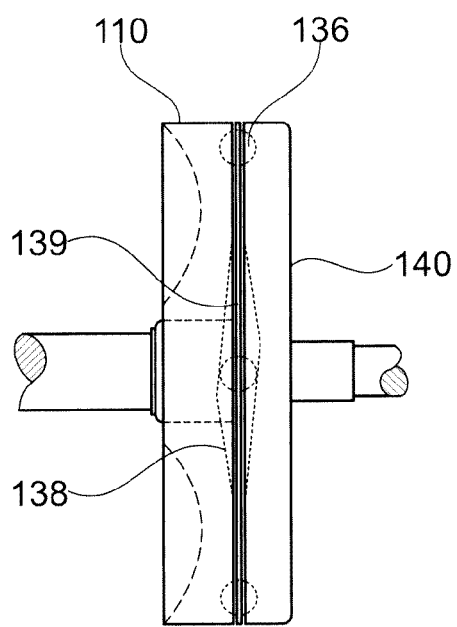
FIG. 16 shows a section through an alternative self-energising axial loading device according to one embodiment of the invention.
Figure 17A:
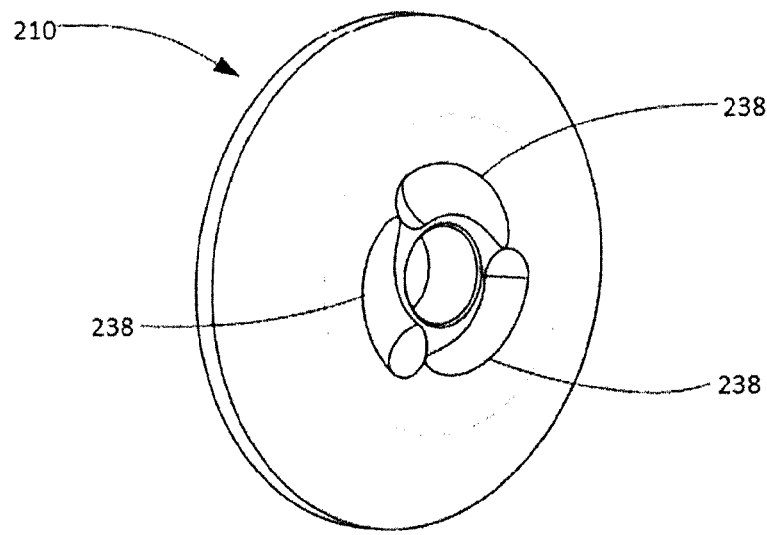
FIGS. 17a and 17b show alternative embodiments of a variator race that incorporates one part of an axial loading mechanism according to one embodiment of the invention.
Figure 17B:
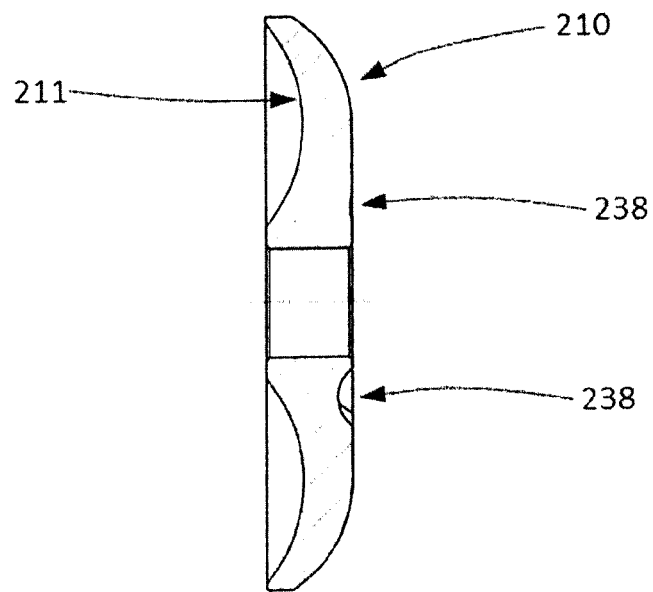

FIG. 15 shows a semi-transparent view of a cam mechanism similar to ball and ramp 34. The input member 40 comprises a circumferential ramp 39 within which a ball bearing 36 runs. As is known, the V-formation (in circumferential section) allows for generation of end load due to either positive or negative torque transmitted by the mechanism 34. FIG. 16 shows a sectional view of a similar ball and ramp embodiment. A race 110 and an input member 140 trap ball bearings 136 between them and clamp the rolling elements (not shown) with an end load that is proportional to the torque transmitted by this mechanism. This is another example of a ball and ramp that is adapted for bi-directional torque transfer, featuring the V-formations on the cams. FIGS. 17*a* and 17*b* show a race 210 with working surface 211, and a circumferential ramp 238 integrally formed in the back of the race 210. The cam is adapted for unidirectional torque transfer only, hence each cam formation does not appear as a V in circumferential section but as a single ramp. Such an embodiment advantageously allows for greater angular rotation (as some of the ramp need not be reserved for torque transfer in the opposite direction) and hence a lower axial variator stiffness may be accommodated if required. Manufacturing cost may also be reduced as there are fewer features on the race. This embodiment is especially suitable for applications that only require transmission of torque in a single direction, such as a variable speed supercharger (as previously described) that includes a centrifugal or axial compressor.

The invention claimed is:

1. A variator comprising first and second races disposed for rotation about a variator axis and at least one rolling element disposed in a cavity between the first and second races, wherein:

in a drive configuration, drive is transmitted between the first and second races and the at least one rolling element;

in a neutral configuration, the at least one rolling element, the first and second races, or both the at least one rolling element and the first and second races are configured whereby the first and second races can move independently of one another;

one race includes a formation formed on a working surface of the one race facing the at least one rolling element that is shaped to exert an axial force on one or both races in response to tilting of the at least one rolling element; and the formation of the one race at least partially defines a disconnect region formed in the one race in which the at least one rolling element is at least partially positioned when the variator is in the neutral configuration.

2. The variator according to claim 1, further comprising an end-load application device operable to cause the variator to enter the neutral configuration by reducing end-load, which reduces contact traction forces between the first and second races and the at least one rolling element towards zero.

3. The variator according to claim 2 in which subsequent re-application of end-load generates shear forces so returning the variator to the drive configuration.

4. The variator according to claim 2 in which the end-load application device includes a resiliently deformable member.

5. The variator according to claim 2 in which the end-load application device includes a link to at least one of the first and second races arranged to apply an end-load to the at least one rolling element that is related to torque transmitted by the variator.

6. The variator according to claim 1 wherein when the at least one rolling element is at least partially positioned in the disconnect region, the at least one rolling element does not make contact with one or both of the first and second races.

7. The variator according to claim 6 in which the disconnect region is adjacent to that in which contact is made between the at least one rolling element and one or both of the first and second races when the variator is operating in a low ratio.

8. The variator according to claim 6 which has a toroidal cavity that is formed with a greater minor radius in the disconnect region as compared with regions of the cavity adjacent to it.

9. The variator according to claim 1 in which, in the neutral configuration, a race contact surface of the at least one rolling element is adjacent to the periphery of one of the first and second races.

10. The variator according to claim 1 in which the distance between the first and second races is variable.

11. The variator according to claim 10, further comprising a stop that operates to limit the extent to which the first and second races can move towards one another, the stop being effective to carry the end-load instead of the at least one rolling element.

12. The variator according to claim 1, further comprising a re-engagement structure operable to cause the variator to change from the neutral to the drive configuration.

13. The variator according to claim 12 in which the re-engagement structure operates by directly moving the at least one rolling element to change a tilt angle.

14. The variator according to claim 1 wherein the formation increases the force or the mechanical advantage that the at least one rolling element can exert on the races.

15. The variator according to claim 1 in which, while in the neutral configuration, connection is maintained between the at least one rolling element and only one of the first or second races.

16. The variator according to claim 15 in which the connection is maintained with a radially inner race contact, the contact being on an input race of the variator.

17. The variator according to claim 1 including a non-self-energising endload device that causes endload to be applied to the variator as a function of at least one rolling element tilt angle while the variator is in the neutral configuration or during transition from the neutral configuration to the drive configuration.

18. The variator according to claim 1 in which a tilt angle of the at least one rolling element is at a tilt angle commensurate with a non-zero variator ratio when in the neutral configuration.

19. A drive system that includes a prime mover, a variator according to claim 1 that has one of the first or second races connected to an output of the prime mover, and a driven device connected to the other of the first or second races of the variator, in which the drive system is operative to cause the variator to enter the neutral configuration during such a time that driving the driven device would serve no useful purpose.

20. The drive system according to claim 19 in which the driven device includes a supercharger arranged to deliver air to an inlet of the prime mover.

21. The drive system according to claim 19 that is configured to operate such that the variator is in the drive configuration when the speed of the prime mover exceeds a threshold.

22. A variator comprising:
an input race and an output race each having a working surface, the input and output races being coaxially mounted for rotation about a variator axis, and a toroidal cavity being defined between the working surfaces;
at least one rolling element disposed between and being in driving engagement with at least one working surface, the at least one rolling element having at least one contact with a working surface that defines a contact radius with respect to the variator axis variable in accordance with the ratio of the variator and a second rolling contact, the at least one rolling element being mounted on a carriage assembly for rotation about a rolling axis, wherein:
the at least one rolling element is mounted for pivotal movement that causes a change in a pitch angle of the at least one rolling element, the pitch angle being about a pitch axis that passes through the at least one rolling element contacts;
the variator further includes a control member operative to actuate the at least one rolling element to undertake the pivotal movement thereby changing the pitch angle, so urging the carriage assembly to pivot about a carriage tilt axis and thereby provide a change in variator ratio;
in a drive configuration, drive is transmitted between the input and output races and the at least one rolling element;
in a neutral configuration, the at least one rolling element, the input and output races, or both the at least one rolling element and the input and output races are configured whereby the input and output races can move independently of one another;
one of the input and output races includes a formation formed on the working surface of the one race facing the at least one rolling element that is shaped to exert an axial force on one or both of the input and output races in response to tilting of the at least one rolling element; and the formation of the one race at least partially defines a disconnect region formed in the one race in which the at least one rolling element is at least partially positioned when the variator is in the neutral configuration.

23. The variator according to claim 22 in which, in the neutral configuration, a change in the pitch axis of the at least one rolling element can cause a contact part of the respective carriage assembly or a contact part fastened with the respective carriage assembly to come into contact with a second formation fixed with respect to a casing of the variator, such contact urging the carriage assembly to change its tilt angle and thereby bring the at least one rolling element associated with the carriage assembly into operative driving contact with the input and output races.

24. The variator according to claim 23 in which the contact part is disposed to one side of a steering axis.

25. The variator according to claim 23 in which the second formation is disposed radially of the carriage assembly with respect to the variator axis.

26. A method of operating a variator comprising first and second races disposed for rotation about a variator axis and at least one rolling element disposed in a cavity between the first and second races, the method comprising:
   operating the variator in a drive configuration in which drive is transmitted between the first and second races and the at least one rolling element; and
   operating the variator in a neutral configuration in which the at least one rolling element, the first and second races, or both the at least one rolling element and the first and second races are configured whereby the first and second races can move independently of one another, wherein the neutral configuration is obtained by moving the at least one rolling element to a position in which it ceases to make contact with at least one of the first or second races; wherein one of the first and second races includes a formation formed on a working surface of the one race facing the at least one rolling element that is shaped to exert an axial force on one or both of the first and second races in response to tilting of the at least one rolling element;
   and wherein the formation of the one race at least partially defines a disconnect region formed in the one race in which the at least one rolling element is at least partially positioned when the variator is in the neutral configuration.

* * * * *